United States Patent
Laulainen

(10) Patent No.: US 8,081,664 B2
(45) Date of Patent: Dec. 20, 2011

(54) METHOD AND ARRANGEMENT FOR REGENERATING A TIMING SIGNAL IN DIGITAL DATA COMMUNICATION

(75) Inventor: Mikko Laulainen, Helsinki (FI)

(73) Assignee: Tellabs Oy, Espoo (FI)

( * ) Notice: Subject to any disclaimer, the term of this patent is extended or adjusted under 35 U.S.C. 154(b) by 911 days.

(21) Appl. No.: 11/885,652

(22) PCT Filed: Apr. 7, 2006

(86) PCT No.: PCT/FI2006/000107
§ 371 (c)(1),
(2), (4) Date: Sep. 5, 2007

(87) PCT Pub. No.: WO2006/106175
PCT Pub. Date: Oct. 12, 2006

(65) Prior Publication Data
US 2008/0181343 A1    Jul. 31, 2008

(30) Foreign Application Priority Data
Apr. 8, 2005 (FI) .................................. 20050359

(51) Int. Cl.
*H04J 3/06* (2006.01)
*G01R 31/08* (2006.01)
*H04B 7/212* (2006.01)
*H04L 7/00* (2006.01)

(52) U.S. Cl. ........ 370/507; 370/232; 370/324; 370/350; 370/503; 375/354

(58) Field of Classification Search .............. 370/232, 370/324, 350, 503, 507; 375/354
See application file for complete search history.

(56) References Cited

U.S. PATENT DOCUMENTS

| 4,494,211 | A | 1/1985 | Schwartz et al. | |
|---|---|---|---|---|
| 5,241,543 | A | 8/1993 | Amada et al. | |
| 2004/0062278 | A1* | 4/2004 | Hadzic et al. | 370/503 |
| 2005/0041692 | A1* | 2/2005 | Kallstenius | 370/503 |
| 2005/0180466 | A1* | 8/2005 | Franchuk et al. | 370/503 |
| 2005/0207387 | A1* | 9/2005 | Middleton et al. | 370/347 |
| 2006/0056560 | A1* | 3/2006 | Aweya et al. | 375/356 |

FOREIGN PATENT DOCUMENTS

| WO | 97/28625 | | 8/1997 |
|---|---|---|---|
| WO | 2005/020486 | A1 | 3/2005 |
| WO | 2005/077063 | A2 | 8/2005 |

* cited by examiner

*Primary Examiner* — Ricky Ngo
*Assistant Examiner* — Paul Masur
(74) *Attorney, Agent, or Firm* — Young & Thompson

(57) ABSTRACT

The invention relates to a method and an arrangement for regenerating a timing signal in digital data communication where two network elements operate in a master/slave loop timing mode. In a solution according to the invention two different frequency difference indicators are formed. Values or changes of the values of both of them in relation to time indicate a frequency difference between a reference timing signal present in a master device and a regenerated timing signal present in a slave device. One frequency difference indicator is formed on the basis of reception taking place in the master device, and the other one on the basis of reception taking place in the slave device. The frequency of the regenerated timing signal is adjusted utilizing information contained by both frequency difference indicators. The probability of incorrect frequency adjustment measures can be thereby reduced.

50 Claims, 7 Drawing Sheets

METHOD AND ARRANGEMENT FOR REGENERATING A TIMING SIGNAL IN DIGITAL DATA COMMUNICATION

FIELD OF THE INVENTION

The invention relates to a method for regenerating a timing signal in digital data communication using a master/slave loop timing mode.

The invention also relates to a method to be used in a master network element for participating in the regeneration of a timing signal in digital data communication using a master/slave loop timing mode.

The invention also relates to a method to be used in a slave network element for regenerating a timing signal in digital data communication using a master/slave loop timing mode.

The invention also relates to an arrangement for regenerating a timing signal in digital data communication using a master/slave loop timing mode.

The invention also relates to a master network element for participating in regeneration of a timing signal in digital data communication using a master/slave loop timing mode.

The invention also relates to a slave network element for regenerating a timing signal in digital data communication using a master/slave loop timing mode.

BACKGROUND

The following acronyms will be used in the description of both the prior art and the invention:
PI: Proportional and Integrating controller
PID: Proportional, Integrating and Derivating controller
SDH: Synchronous Digital Hierarchy, a digital data transmission technology Transmission of digital data between two different data network elements is performed so that a certain amount of bit data is sent to the transmission channel in the sending network element in consecutive cycles of the timing signal. The number of bits sent during the cycle, and the frequency of the timing signal determine the data transfer rate. For example, when 8 bits/cycle are transmitted at the frequency of 1 MHz of the timing signal, the data transfer rate is 8 Mbit/s.

Typically, in a digital data transmission network there are consecutive subareas in the propagation direction of the transmission, in which the nominal data transfer rates are different, or in which the nominal data transfer rates are the same but the phases of their timing signals shift in relation to each other. These subareas of the data transmission network are thus asynchronous in relation to each other. The fact that the phases of the timing signals can shift in relation to each other means that the instantaneous data transfer rates of different subareas can differ from each other, even if the average data transfer rates were equal. When moving across the border between two such subareas, it is necessary to perform speed adjustment, which takes into account the different data transfer rates. If the average data transfer rates differ from each other, speed adjustment is performed by increasing or decreasing the number of bits transmitted in a certain time window. Increasing is carried out by using additional bits, which can be mere stuffing bits, or they can, for example, represent the heading, control, separator and other such information of frame and/or packet structures related to the transmission protocol. Decreasing is carried out by removing said additional bits, which is done when moving from a faster subarea to a slower one. If the average data transfer rates are equal, speed adjustment can be carried out by buffering.

FIG. 1 shows an exemplary data communication network, which is used for describing the prior art. The data communication network shown in FIG. 1 has three subareas A101, A102 and A103. The nominal data transfer rates of subareas A102 and A103 are the same, but the system has no timing signal common to subareas A101 and A102. In order to make the situation sensible, the temporal average of the data transfer rate of subarea A102 must be at least equal to the temporal average of the data transfer rate of subarea A101.

In the situation being examined as an example, the operation is as follows:

The digital data stream D101 produced by the user K101 of the data transmission service arrives at the network element VE101 located at the border of subareas A101 and A102 as synchronized by the timing signal CLK101.

Speed adjustment SA101 is performed in the network element VE101, resulting in a data stream D102.

A data stream D102 is received in the network element VE102 located at the border of subareas A102 and A103, and speed adjustment SA102 is performed on it, resulting in the original data stream D101.

A timing signal CLK102 is generated in the network element VE102 on the basis of the speed of arrival of the portion of the data stream D102 being received, which represents the data stream D101. In other words, the timing signal CLK102 is regenerated. The data stream D101 is sent to another user K102 of the data communication network as synchronized by the timing signal CLK102.

The digital data stream U101 produced by the user K102 arrives at the network element VE102 as synchronized by the timing signal CLK102.

Speed adjustment SA 103 is performed in the network element VE102, resulting in a data stream U102.

The data stream U102 is received in the network element VE101, speed adjustment SA104 is performed on it, and the result is the original data stream U101. The data stream U101 is sent to the user K101 of the data communication network as synchronized by the timing signal CLK101.

The objective is thus to generate the timing signal CLK102 in the network element VE102 so that the momentary frequency of the timing signal is as close to the momentary frequency of the timing signal CLK101 as possible. If the timing signal CLK102 could be formed such that its momentary frequency were continuously the same as the momentary frequency of the timing signal CLK101, the users K101 and K102 of the data communication network would not be able to notice that there are subareas in the network in which the average and/or momentary data transfer rates differ from each other. With regard to the quality of the data transmission service, it is essential that the momentary frequency of the regenerated timing signal CLK102 does not differ too much from the momentary frequency of the timing signal CLK101. For this reason, international standardization organizations, such as ITU (International Telecommunication Union), have set limits on frequency deviations of different frequencies.

In the mode of operation described above, the network element VE101 functions as the master with regard to mutual synchronization of subareas A101 and A103 of the network, and the network element VE102 functions as the slave. Duplex data transmission functions in a master/slave loop timing mode, in which the timing signal CLK102 regenerated in the slave VE102 is used in the slave for synchronizing the data transmission of both transmission directions.

The method by which the timing signal is generated for receiving the data stream D102 in the network element VE102 is not significant with regard to the present invention. Said timing signal can be generated e.g. by means of the data stream D102 being received, using conventional synchronization methods, or a reference clock signal can be spread in the subarea A102 of the network, like in SDH (Synchronous Digital Hierarchy) networks. The same applies to the reception of the data stream U102 in the network element VE101.

The regeneration of the timing signal CLK102 is made more difficult by the fact that the data transmission delay between the network elements VE101 and VE102 is a variable quantity. Packet-switched data networks, in particular, tend to cause a strong variation in the transmission delay, but the conventional time slot switched data transmission networks also cause variation in the delay. Another phenomenon, which makes it more difficult to regenerate the timing signal, is the loss of data being transferred at times as a result of congestion of the network or other interference.

A prior art method for generating a timing signal in a slave in the master-slave timing modes of the type described above is presented in FIG. 2. The speed adjustment block SA102 includes means P201, by which the bits that are unnecessary and would actually be harmful in the resulting data stream D101, are removed from the arriving data stream D102. The removal of the bits is not required if the data streams D101 and D102 have the same average data transfer rate. The data stream D101 is directed to the buffer memory BM201, from which the data stream is read out as synchronized by the timing signal CLK102. The state of fullness F201 of the buffer memory BM201 is measured/monitored. The state of fullness has been given the reference value Fref201. After this, the difference between the actual value and the reference value of the state of fullness is filtered by the low-pass filter LPF201. The momentary frequency of the timing signal CLK102 is controlled on the basis of the output of the low-pass filtering. Low-pass filtering LPF201 is used in order to prevent the frequency variation of the regenerated timing signal CLK102 from exceeding the limits permitted.

The problems entailed by the prior art solution presented above can be studied from FIG. 1. This method is not able to determine whether the reduction in the fullness of the buffer memory is caused by the fact that the frequency of the regenerated timing signal CLK102 is higher than the frequency of the timing signal CLK101, or that data transmission is momentarily prevented and/or the data transmission delay is momentarily higher than normal. Also, the system is not able to tell whether the frequency of the timing signal CLK102 is too low or whether the transmission delay is momentarily lower than normal. For this reason, various disturbances in the network significantly increase the risk that incorrect adjustment is performed on the frequency of the timing signal CLK102. This naturally increases the risk that the momentary frequency of the timing signal CLK102 differs considerably from the momentary frequency of the timing signal CLK101.

Another prior art method for regenerating the timing signal CLK102 is based on time stamps. In this method, time stamp information, which indicates the amount of time measured by the timing signal CLK101 between the transmission of consecutive time stamps, is added to the data stream D102 in the network element VE101. In the network element VE102, the difference between the arrival times of the time stamps is measured by means of the timing signal CLK102. By comparing the time difference indicated by the timing signal CLK101 and included in the time stamps with the time difference measured by the timing signal CLK102, a quantity indicating the frequency difference between those timing signals is obtained. The data communication network between the network elements VE101 and VE102 may cause a difference between the transmission delays of different time stamps. Therefore, an interference component with a zero average is generated in the quantity indicating the frequency difference, and low-pass filtering is applied in order to remove it. The momentary frequency of the timing signal CLK102 is adjusted on the basis of the output of the low-pass filtering. The problem caused by the fact that data being transferred is lost at times can be eliminated by marking consecutive time stamps in such a way that a possible loss of a time stamp is noticed. In this way, incorrect frequency adjustment measures caused by the loss of data being transferred can be avoided.

Let us assume that the time between the moments of reception of consecutive time stamps measured as the number of cycles of the timing signal CLK102 is higher than its reference value. This may be due to the fact that the frequency of the timing signal CLK102 is higher than the frequency of the timing signal CLK101 and the cycle length of the CLK102 signal is thus too small, or the fact that the data transmission delay is increasing. The problem with the second prior art method presented is the fact that the phenomena caused by the variation of the transmission delay look the same as the phenomena caused by the frequency difference. This causes the risk that incorrect frequency adjustment is carried out. Correspondingly, the system is not able to tell whether the frequency of the timing signal CLK102 is too low or whether the transmission delay is decreasing.

SUMMARY

It is an objective of the invention to provide a method and arrangement of a new type for regenerating a timing signal in digital data transmission, by means of which invention the drawbacks related to the prior art presented above can be eliminated or reduced.

The invention is based on the fact that in the master/slave loop timing mode described above, the timing situation is as follows:

1) A data stream is received in the slave, its speed of arrival being dependent on the timing signal present in the master, and a timing signal is present in the slave, the frequency of which timing signal is wanted to be kept as close to the frequency of the timing signal in the master as possible.
2) A data stream is received in the master, its speed of arrival depending on the timing signal present in the slave.

In a general case, the data stream received at points 1) and 2) above can be part of such a data stream which also carries such payload and/or control, supervision, stuffing or other such information which is not significant with regard to the timing operation meant in this document. The fact mentioned at point 1) is used in the prior art methods for regenerating a timing signal. The facts mentioned both at point 1) and point 2) are utilized in the method and arrangement according to the invention for regenerating a timing signal. In the method according to the invention, by means of the data stream received in the master, a quantity is formed for the purpose of indicating whether the frequency of the timing signal present in the master is higher or lower than the frequency of the timing signal present in the slave. Said quantity indicating the frequency deviation can be formed in the master by the same method as the corresponding quantity indicating the frequency deviation is formed in the slave, on the basis of the state of fullness of the buffer memory, for example. The quantity indicating the frequency deviation and formed in the master is not used for adjusting the timing signal being present, because from the point of view of this invention, the timing signal is externally determined reference timing.

Instead, the information contained by the quantity formed in the master and indicating the frequency deviation is sent to the slave. This information is utilized for adjusting the frequency of the timing signal present in the slave in such a way that the adjustment measures are controlled on the basis of both the quantity formed in the slave and indicating the frequency difference and the quantity formed in the master and indicating the frequency difference.

As a first aspect of the invention a method for regenerating a timing signal in digital data communication using a master/slave loop timing mode is provided. The method comprises:
  transmitting a digital data stream from a master network element functioning as a master to a slave network element functioning as a slave, speed of arrival of the data stream arriving at the slave network element depending on frequency of a reference timing signal present in the master network element,
  transmitting a digital data stream having an opposite direction from said slave network element to said master network element, speed of arrival of the data stream arriving at the master network element depending on frequency of a regenerated timing signal present in the slave network element,
  forming, on the basis of the speed of arrival of the data stream arriving at the master network element, a master end indicator a value or a change of the value of which in relation to time indicates a frequency difference between the reference timing signal and the regenerated timing signal,
  forming, on the basis of the speed of arrival of the data stream arriving at the slave network element, a slave end indicator a value or a change of the value of which in relation to time indicates the frequency difference between the reference timing signal and the regenerated timing signal, and
  adjusting the frequency of the regenerated timing signal on the basis of a combined effect of information contained by said master end indicator and information contained by said slave end indicator.

As a second aspect of the invention a method to be used in a master network element for participating in regeneration of a timing signal in digital data transmission operating in a master/slave loop timing mode is provided. The method comprises:
  transmitting a digital data stream to a slave network element functioning as a slave, transmission speed depending on frequency of a reference timing signal present in the master network element,
  receiving a digital data stream transmitted from the slave network element, speed of arrival of the received data stream depending on frequency of a regenerated timing signal present in the slave network element,
  forming, on the basis of the speed of arrival of the received data stream, a master end indicator a value or a change of the value of which in relation to time indicates a frequency difference between the reference timing signal and the regenerated timing signal, and
  transmitting the formed master end indicator to the slave network element.

As a third aspect of the invention a method to be used in a slave network element for regenerating a timing signal in digital data communication using a master/slave loop timing mode is provided. The method comprises:
  transmitting a digital data stream to a master network element functioning as a master, transmission speed depending on frequency of a regenerated timing signal present in the slave network element,
  receiving a digital data stream transmitted from the master network element, speed of arrival of the received data stream depending on frequency of a reference timing signal present in the master network element,
  receiving from the master network element a master end indicator a value or a change of the value of which in relation to time indicates a frequency difference between the reference timing signal and the regenerated timing signal, and
  forming, on the basis of the speed of arrival of the received data stream, a slave end indicator a value or the change of the value of which in relation to time indicates the frequency difference between the reference timing signal and the regenerated timing signal, and
  adjusting the frequency of the regenerated timing signal on the basis of a combined effect of information contained by the received master end indicator and information contained by the formed slave end indicator.

As a fourth aspect of the invention an arrangement for regenerating a timing signal in digital data communication using a master/slave loop timing mode is provided. The arrangement comprises:
  a master network element arranged to receive digital data transmitted from a slave network element operating as a slave and to transmit digital data to the slave network element,
  a slave network element arranged to receive digital data transmitted from the master network element and to transmit digital data to the master network element,
  in the master network element, means for sending a digital data stream to the slave network element in such a way that speed of arrival of the data stream arriving at the slave network element depends on frequency of a reference timing signal present in the master network element,
  in the slave network element, means for sending a digital data stream to the master network element in such a way that speed of arrival of the data stream arriving at the master network element depends on frequency of a regenerated timing signal present in the slave network element,
  means for forming a master end indicator on the basis of the speed of arrival of the data stream arriving at the master network element, a value or a change of the value of the master end indicator in relation to time indicating a frequency difference between the reference timing signal and the regenerated timing signal,
  means for forming a slave end indicator on the basis of the speed of arrival of the data stream arriving at the slave network element, a value or a change of the value of the slave end indicator in relation to time indicating the frequency difference between the reference timing signal and the regenerated timing signal, and
  means for adjusting the frequency of the regenerated timing signal on the basis of a combined effect of information contained by said master end indicator and information contained by said slave end indicator.

As a fifth aspect of the invention a master network element for contributing to regeneration of a timing signal in digital data transmission operating in a master/slave loop timing mode is provided. The master network element comprises:
  means for sending a digital data stream to a slave network element functioning as the slave, speed of transmission of the data stream to be transmitted depending on frequency of a reference timing signal present in the master network element, means for receiving a digital data stream transmitted from the slave network element, means for forming a master end indicator on the basis of speed of arrival of the received data stream, a value or a change of the value of the master end indicator in relation to time indicating a frequency difference between the reference timing signal and a regenerated timing signal present in the slave network element, and means for sending said master end indicator to the slave network element.

As a sixth aspect of the invention a slave network element for regenerating a timing signal in digital data communication using a master/slave loop timing mode is provided. The slave network element comprises:

means for sending a digital data stream to a master network element functioning as a master, speed of transmission of the data stream to be transmitted depending on frequency of a regenerated timing signal present in the slave network element, means for receiving a digital data stream transmitted from the master network element, means for receiving a master end indicator transmitted from the master network element, a value or a change of the value of the master end indicator in relation to time indicating a frequency difference between a reference timing signal present in the master network element and the regenerated timing signal present in the slave network element, means for forming a slave end indicator on the basis of speed of arrival of the data stream arriving at the slave network element, a value or a change of the value of the slave end indicator in relation to time indicating the frequency difference between the reference timing signal and the regenerated timing signal, and means for adjusting the frequency of the regenerated timing signal on the basis of a combined effect of information contained by the received master end indicator and information contained by the formed slave end indicator.

Some embodiments of the invention are presented in the dependent claims.

Compared to the prior art solutions, the invention provides the advantage that the probability of incorrect frequency adjustment measures caused by network interference and transmission delay is reduced. It is unlikely that network interference would cause a situation in which the quantities indicating a frequency difference and formed in both the master and the slave would both incorrectly indicate a need to decrease or increase the frequency of the regenerated timing signal.

BRIEF DESCRIPTION OF FIGURES

In the following, the invention and its other advantages will be described in more detail with reference to the accompanying figures, in which.

DETAILED DESCRIPTION OF EMBODIMENTS

Figure 1:
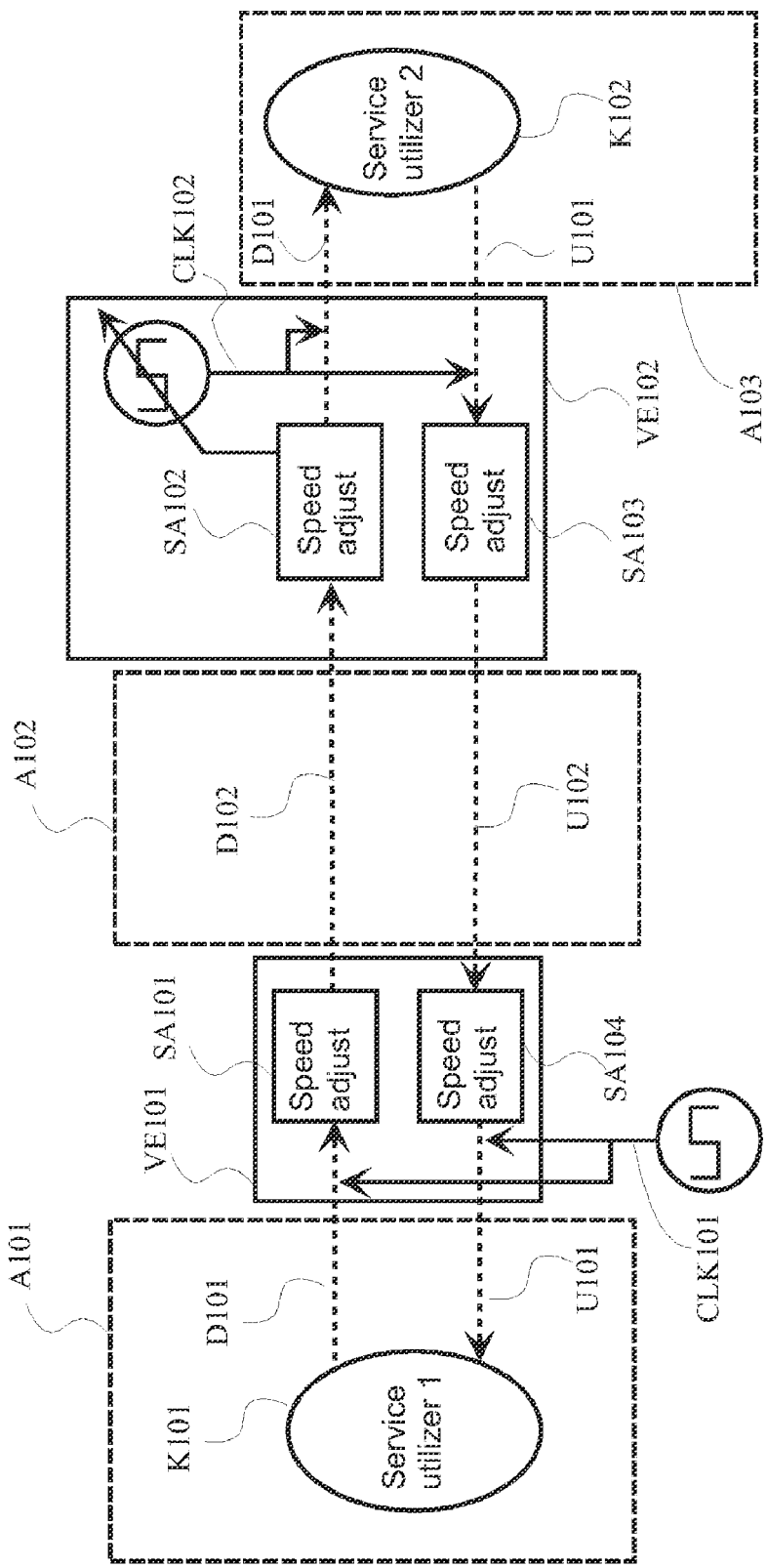
FIG. 1 illustrates the principle of an exemplary data transmission network, which is used to describe the prior art.
Figure 2:
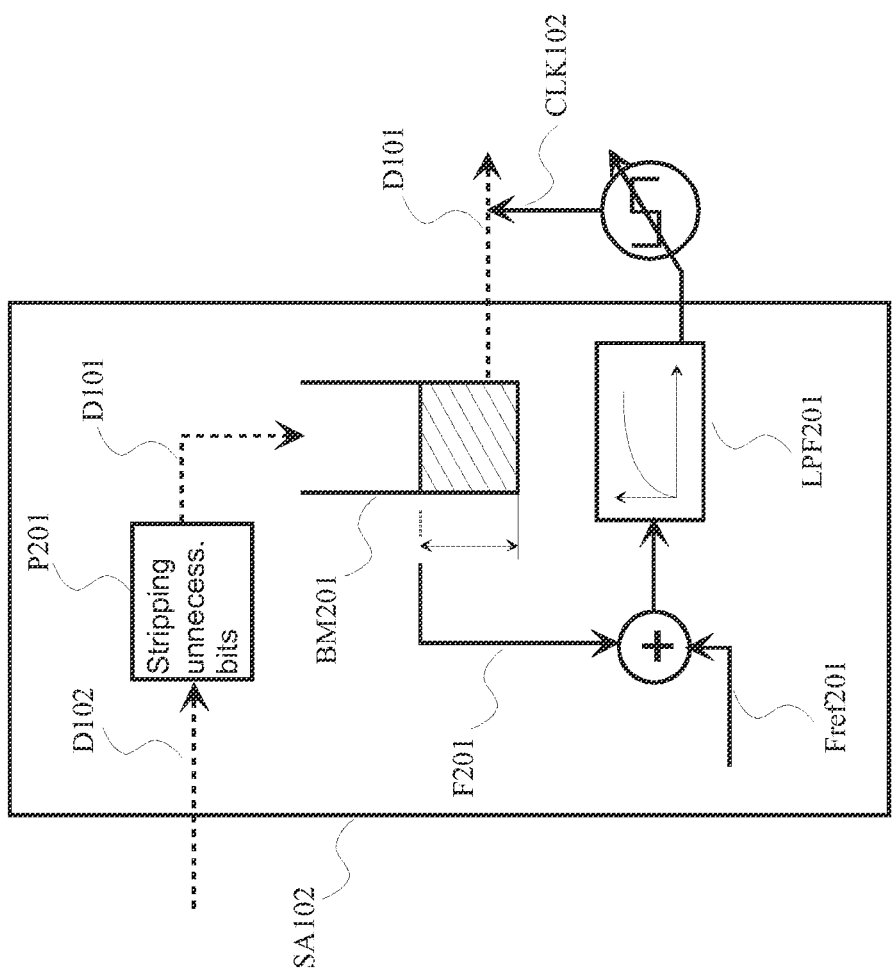
FIG. 2 is a block diagram of a prior art method for generating a timing signal on the basis of the arriving data stream.

FIGS. 1 and 2 were already dealt with above in connection with the description of the prior art.

Figure 3:
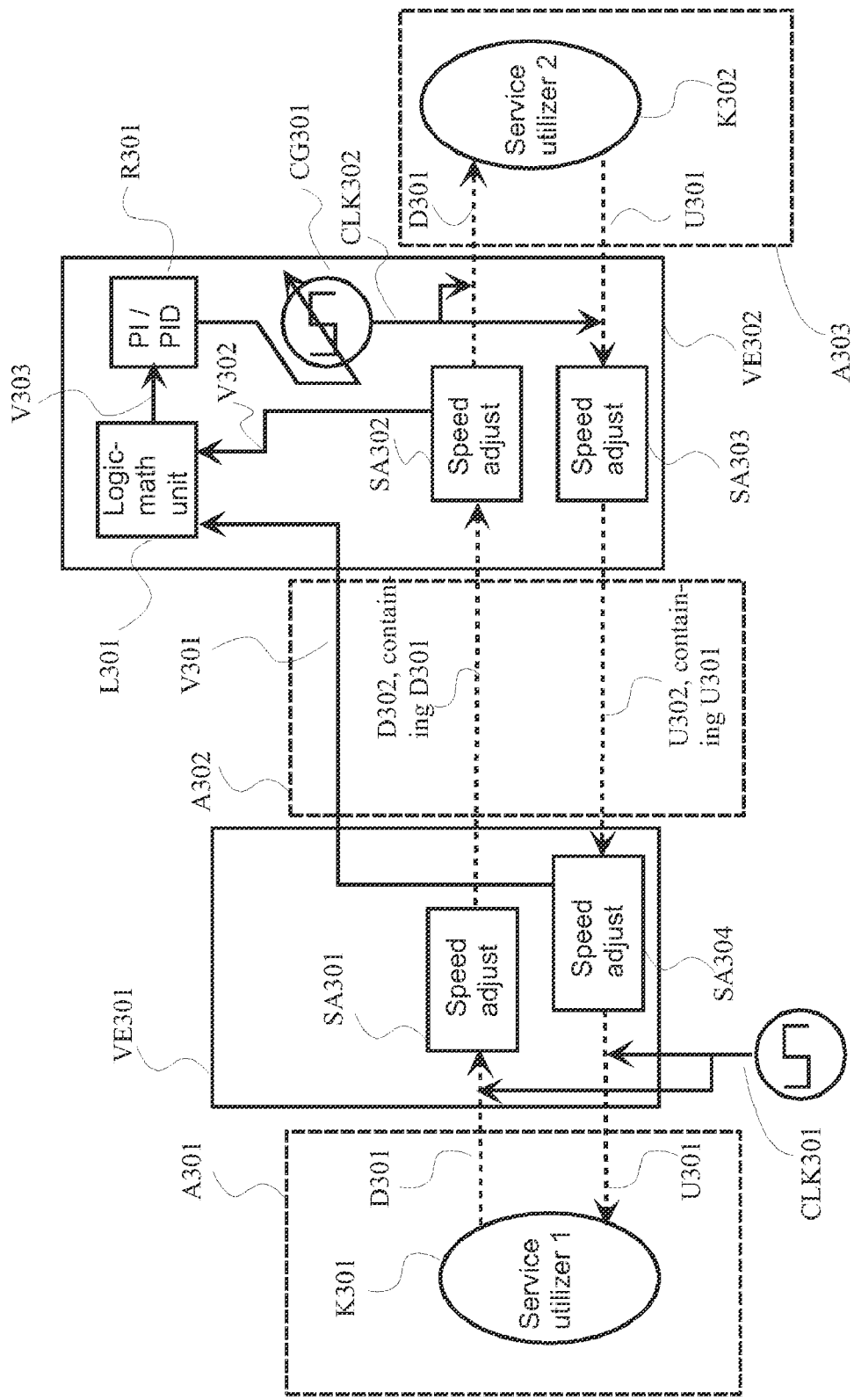
FIG. 3 is a diagram illustrating the principle of the arrangement according to the invention for generating a timing signal.

FIG. 3 shows the subareas A301, A302 and A303 of the data transmission network. At the border between the subareas A301 and A302 there is a master network element VE301 functioning as the master with regard to timing, and at the border of the subareas A302 and A303 there is a slave network element VE302 functioning as the slave with regard to timing. The master network element VE301 is also connected to the system K301, which can be a terminal device utilizing a data transmission service, for example. Correspondingly, the slave network element VE302 is connected to the system K302. The subarea A302 is to be understood in a broad sense so that it can be the world-wide Internet, for example.

Data transmission in both directions between the master network element VE301 and the system K301 is synchronized by the timing signal CLK301, which is, from the point of view of this invention, the given reference timing signal, but the method by which it is generated does not fall within the scope of this invention. Data transmission between the slave network element VE302 and the system K302 is synchronized by a timing signal CLK302, which is adjusted with the purpose of keeping the frequency of the timing signal as close to the frequency of the timing signal CLK301 as possible.

Speed adjustment SA301, in which the required number of bits is added to the data stream D301, is performed in data transmission from subarea A301 to subarea A302 of the data communication network. If bits have to be added, they may be bits related to the frame or packet structures or mere stuffing bits. The result of speed adjustment SA301 is the data stream D302. A speed adjustment SA302, in which the bits added in the speed adjustment SA301 are removed from the data stream D302 and the original data stream D301 is obtained as the result, is performed in data transmission from subarea A302 to subarea A303 of the data transmission network. Corresponding speed adjustments SA303 and SA304 are performed on the data streams U301 and U302 when moving from subarea A303 to subarea A302 and further to subarea A301.

A part of the data stream U302 arriving at the master network element VE301 represents the data stream U301. On the basis of the speed of arrival of the portion representing the data stream U301, a master end indicator V301 is formed in the master network element, and the value or the change of the value in relation to time of the master end indicator tends to indicate whether the frequency of the regenerated timing signal CLK302 is lower or higher than the frequency of the reference timing signal CLK301. The truthfulness of this indication depends on the strength of various disturbing factors, such as the variation of the transmission delay. The information contained by the master end indicator V301 is transmitted at suitable intervals either with the data stream D302 or using some other data transmission channel to the slave network element VE302. Said data transmission may also be included in the portion of data stream D302 representing data stream D301.

A part of data stream D302 arriving at the slave network element VE302 represents data stream D301. On the basis of the speed of arrival of the portion representing data stream D301, a slave end indicator V302 is formed in the master network element, and the value or the change of the value in relation to time of the slave end indicator tends to indicate whether the frequency of the regenerated timing signal CLK302 is lower or higher than the frequency of the reference timing signal CLK301.

The regenerated timing signal CLK302 is generated by a controllable timing signal generator CG301, which can be a VCO (voltage controlled oscillator) or NCO (numerically controlled oscillator), for example. The frequency of the timing signal CLK302 being generated is controlled by a controller value V303, which is formed from the master and slave end indicators V301 and V302 by a logical-mathematical signal processing operation L301. In addition, the controller value V303 can be used as the input signal to a controller R301 of the PI, PID or some other type, the output of which influences the timing signal generator CG301.

Figure 4A:
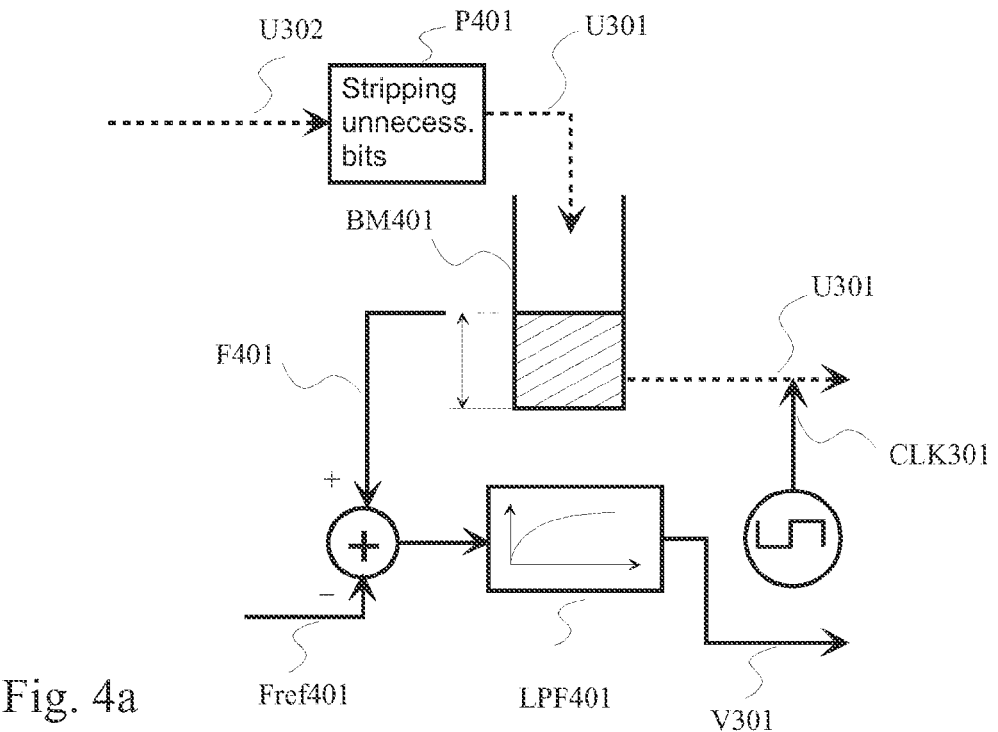
FIGS. 4a and 4b show arrangements which can be used in the systems according to the invention for generating quantities indicating the frequency difference between the timing signal present in the master and the timing signal present in the slave.
Figure 4B:
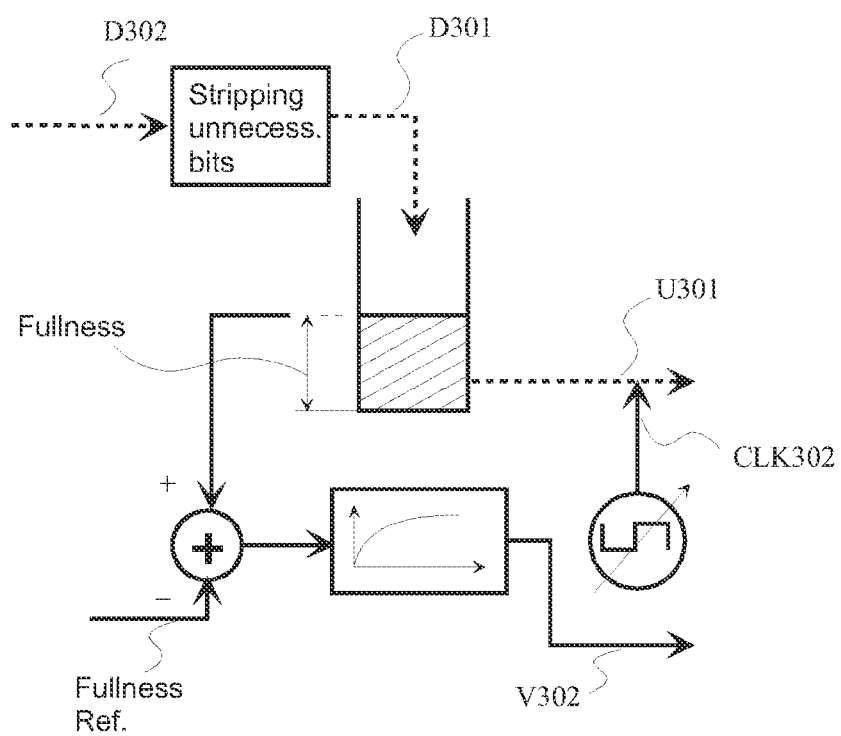

In an embodiment of the invention, the master end indicator V301 is formed by the procedure described in FIG. 4a on the basis of the fullness of the buffer memory, and the slave end indicator V302 is formed similarly by the procedure described in FIG. 4b. The procedures presented in FIGS. 4a and 4b result in that the values of the master and slave end indicators V301 and V302 tend to indicate the frequency difference between the regenerated timing signal CLK302 and the reference timing signal CLK301.

In FIG. 4a, bits that are unnecessary and that would be actually harmful in the resulting data stream U301, are removed from the arriving data stream U302, block P401. The removal of the bits is not required if the data streams U301 and U302 have the same average data transfer rate. The data stream U301 is directed to the buffer memory BM401, from which the data stream is read out as synchronized by the reference timing signal CLK301. The fullness F401 of the buffer memory BM401 is measured/monitored. The fullness has been given the reference value Fref401. After this, the difference between the actual value and the reference value of the fullness is filtered by the low-pass filter LPF401. The master end indicator V301 is the output of the low-pass filter. The operation of the arrangement shown in FIG. 4b is similar. As the logical-mathematical signal processing means L301 it is possible to use a simple arithmetic element, for example, so that the control value V303 is the sum of the master and slave end indicators multiplied by suitable constants: $C1*V301+C2*V302$. Furthermore, in the logical-mathematical signal processing L301 it is possible to implement an arrangement in which the frequency control of the regenerated timing signal CLK302 is prevented, if the master and slave end indicators V301 and V302 do not agree on the direction of the frequency control required.

In another embodiment of the invention, the master end indicator V301 is the fullness F401 of the buffer memory BM401 located in the master network device, and the slave end indicator V302 is formed according to FIG. 4b like in the embodiment of the invention presented above. In this embodiment of the invention, the change of the value of the master end indicator V301 in relation to time tends to indicate the frequency difference between the regenerated timing signal CLK302 and the reference timing signal CLK301. As the logical-mathematical signal processing means L301, it is possible to use e.g. an arrangement in which the reference value Fref401 of the fullness of the buffer memory BM401 is subtracted from the master end indicator V301, and the obtained difference is filtered by the low-pass filter. The adjusting value V303 can be formed in such a way, for example, that the result of the low-pass filtering is multiplied by a suitable constant and added to the slave en indicator V302, which has been multiplied by a suitable constant.

For illustrating the operation, let us consider an exemplary situation in which the frequency of the regenerated timing signal CLK302 is lower than the frequency of the reference timing signal CLK301, and data transmission functions in both directions without interference. Then the fullness of the buffer memory of the slave network element NE302 increases and the fullness of the buffer memory of the master network element NE301 decreases. In other words, the directions of the change of the fullness of both buffer memories indicate that the frequency of the regenerated timing signal CLK302 is lower than the frequency of the reference timing signal CLK301. Then it is advantageous to increase the frequency of the regenerated timing signal CLK302.

Let us next consider a situation in which the frequency of the regenerated timing signal CLK302 is the same as the frequency of the reference timing signal CLK301, but data transmission from the master network element VE301 to the slave network element VE302 is prevented. Let us also assume that data transmission in the other direction operates normally. Then the fullness of the buffer memory of the slave network element NE302 decreases, but the fullness of the buffer memory of the master network element does not show a clear tendency to increase or decrease. In that case, the perceptions of frequency differences made in different network elements do not support each other, and thus it is advantageous to prevent the frequency adjustment of the timing signal CLK302, or at least it is advantageous to reduce the extent of the adjustment.

An embodiment of the invention is an arrangement in which the master end indicator V301 and/or the slave end indicator V302 is formed by the time stamp principle, which has been described in this document in connection with the prior art. The kind of close examination used to illustrate the operation above can also be applied to this embodiment.

Figure 5:
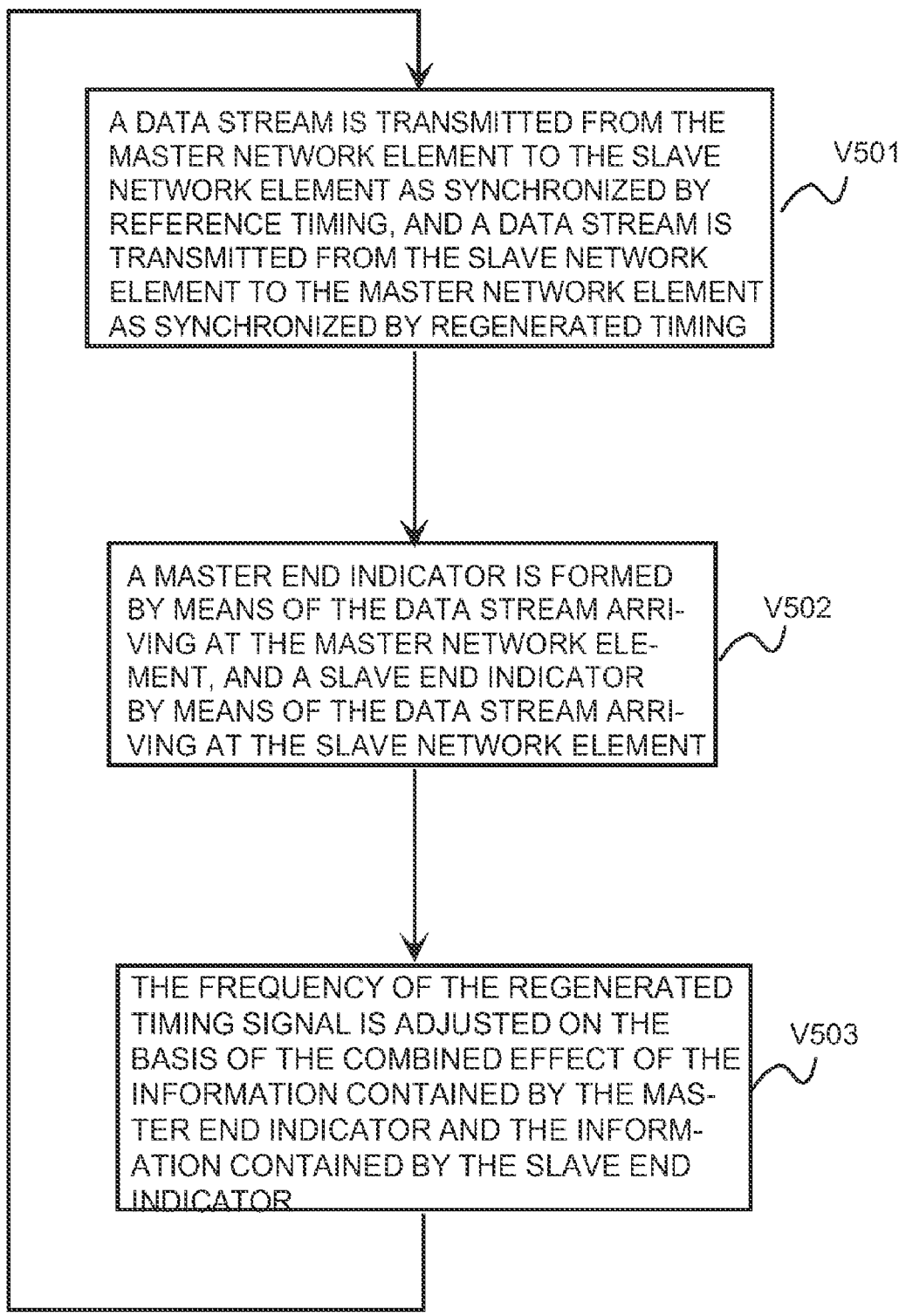
FIG. 5 is a flow chart of the method according to an embodiment of the invention.

The method according to the invention forms a closed control loop. The operation is presented as a flow chart in FIG. 5. In step V501, a data stream is sent from the master network element to the slave network element as synchronized by the reference timing signal, and a data stream is sent from the slave network element to the master network element as synchronized by the regenerated timing signal. In step V502, a master end indicator is formed by means of the data stream arriving at the master network element, and correspondingly a slave end indicator is formed by means of the data stream arriving at the slave network element. In step V503, the frequency of the regenerated timing signal is adjusted on the basis of the combined effect of the information contained by the master end indicator and the information contained by the slave end indicator.

Figure 6:
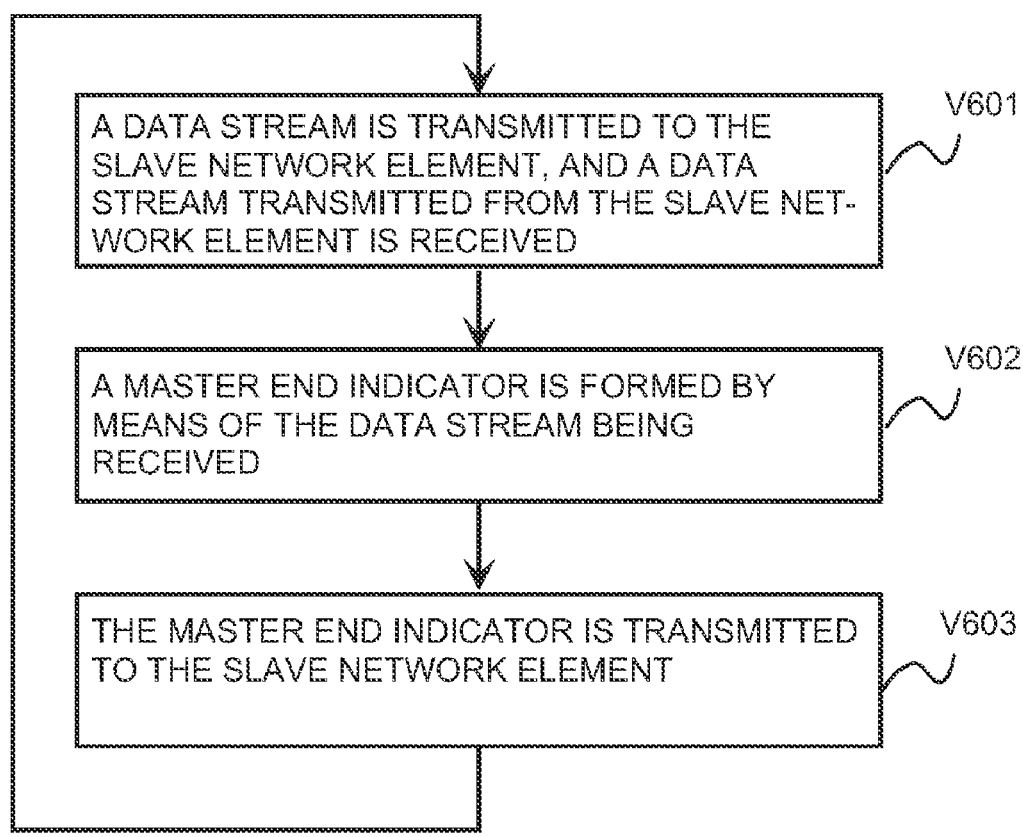
FIG. 6 is a flow chart of the method used in the network element operating as the master according to an embodiment of the invention.

A method according to the invention, used in the master network element, which assists in the frequency adjustment of the regenerated timing signal, is presented as a flow chart in FIG. 6. In steps V601, V602 and V603, data streams are transmitted and received with the slave network element, a master end indicator is formed by means of the received data stream, and the formed master end indicator is sent to the slave network element.

Figure 7:
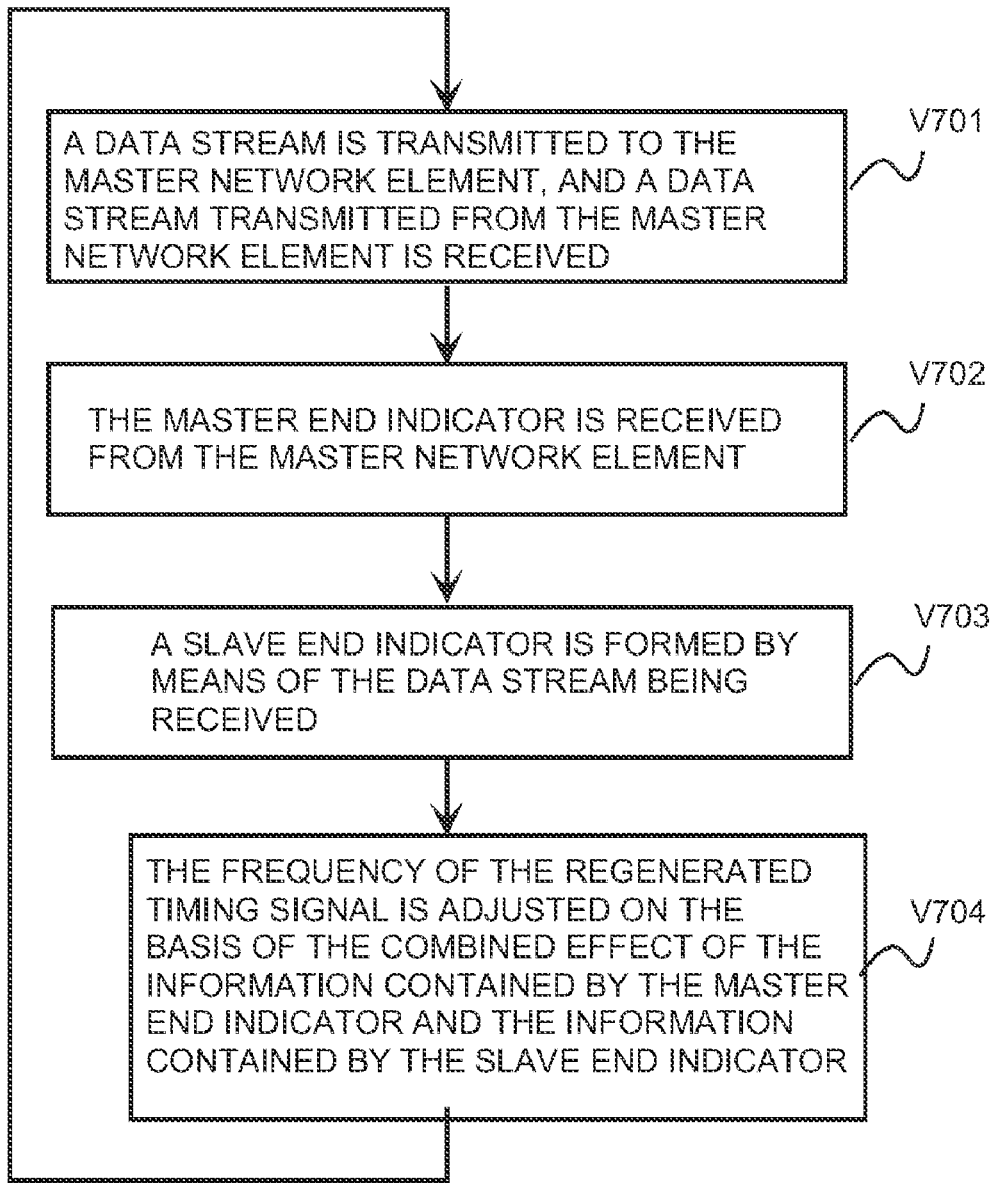
FIG. 7 is a flow chart of the method used in the network element operating as the slave according to an embodiment of the invention.

A method according to the invention used in a slave network element for adjusting the frequency of the regenerated timing signal is presented as a flow chart in FIG. 7. In steps V701, V702, V703 and V704, data streams are transmitted and received with the master network element, a master end indicator sent from the master network element is received, a slave end indicator is formed by means of the received data stream, and the frequency of the regenerated timing signal is adjusted on the basis of the combined effect of the master end indicator and the slave end indicator.

The invention provides a remarkable advantage especially if the subarea A302 is a packet-switched network, which causes significant variation in the transmission delay and/or loss of the packets being transmitted. The invention also helps to reduce the risk of incorrect frequency adjustment measures of the regenerated timing signal also in such a situation typical of packet-switched networks in which packets going in different directions are routed to use different paths.

The invention is not limited merely to the above example of application, but many modifications thereof are possible within the scope of the inventive idea defined by the independent claims. The embodiments presented in the independent claims are freely combinable with the features presented in any other claim, if not otherwise stated.

The invention claimed is:

1. A method for regenerating a timing signal in digital data communication using a master/slave loop timing mode, the method comprising:
    transmitting a digital data stream from a master network element functioning as a master to a slave network element functioning as a slave, wherein a speed of arrival of the data stream arriving at the slave network element, expressed as a number of arriving bits per second, depends on a frequency of a reference timing signal present in the master network element,
    transmitting a digital data stream having an opposite direction from said slave network element to said master network element,
    wherein a speed of arrival of the data stream arriving at the master network element, expressed as a number of arriving bits per second, depends on a frequency of a regenerated timing signal present in the slave network element,
    forming, on the basis of the speed of arrival of the data stream arriving at the master network element, a master end indicator a value or a change of the value of which in relation to time indicates a frequency difference between the reference timing signal and the regenerated timing signal,
    forming, on the basis of the speed of arrival of the data stream arriving at the slave network element, a slave end indicator a value or a change of the value of which in relation to time indicates the frequency difference between the reference timing signal and the regenerated timing signal, and
    adjusting the frequency of the regenerated timing signal on the basis of a combined effect of information contained by said master end indicator and information contained by said slave end indicator.

2. The method according to claim 1, wherein the master end indicator is essentially fullness of a buffer memory located in the master network element.

3. The method according to claim 1, wherein the master end indicator is essentially a difference between fullness and a reference value of the fullness of a buffer memory located in the master network element.

4. The method according to claim 1, wherein the master end indicator is formed essentially by filtering a difference between fullness and a reference value of the fullness of a buffer memory located in the master network element with a low-pass filter.

5. The method according to claim 1, wherein said master end indicator is formed by a time stamp method.

6. The method according to claim 1, wherein the slave end indicator is essentially fullness of a buffer memory located in the slave network element.

7. The method according to claim 1, wherein the slave end indicator is essentially a difference between fullness and a reference value of the fullness of a buffer memory located in the slave network element.

8. The method according to claim 1, wherein the slave end indicator is formed essentially by filtering a difference between fullness and a reference value of the fullness of a buffer memory located in the slave network element with a low-pass filter.

9. The method according to claim 1, wherein said slave end indicator is formed by a time stamp method.

10. The method according to claim 1, wherein the frequency of the regenerated timing signal present in the slave network element is adjusted on the basis of an adjusting value, which is formed by a logical-mathematical operation utilizing both the information contained by the master end indicator and the information contained by the slave end indicator.

11. The method according to claim 10, wherein said logical-mathematical operation prevents frequency adjusting action if said master end indicator and slave end indicator are not unanimous on a direction of a required frequency adjustment.

12. The method according to claim 10, wherein said adjusting value is connected to an input of a PI- or PID-regulator and an output of the regulator controls a timing signal generator, which produces the regenerated timing signal present in the slave network element.

13. A method to be used in a master network element for participating in regeneration of a timing signal in digital data transmission operating in a master/slave loop timing mode, the method comprising:
    transmitting a digital data stream to a slave network element functioning as a slave, wherein a transmission speed, expressed as a number of bits per second, depends on a frequency of a reference timing signal present in the master network element,
    receiving a digital data stream transmitted from the slave network element, wherein a speed of arrival of the received data stream, expressed as a number of bits per second, depends on a frequency of a regenerated timing signal present in the slave network element,
    forming on the basis of the speed of arrival of the received data stream, a master end indicator a value or a change of the value of which in relation to time indicates a frequency difference between the reference timing signal and the regenerated timing signal, and
    transmitting the formed master end indicator to the slave network element.

14. The method according to claim 13, wherein the master end indicator is essentially fullness of a buffer memory located in the master network element.

15. The method according to claim 13, wherein the master end indicator is essentially a difference between fullness and a reference value of the fullness of a buffer memory located in the master network element.

16. The method according to claim 13, wherein the master end indicator is formed essentially by filtering a difference between fullness and a reference value of the fullness of a buffer memory located in the master network element with a low-pass filter.

17. The method according to claim 13, wherein said master end indicator is formed by a time stamp method.

18. A method to be used in a slave network element for regenerating a timing signal in digital data communication using a master/slave loop timing mode, the method comprising:
   transmitting a digital data stream to a master network element functioning as a master, wherein a transmission speed, expressed as a number of bits per second, depends on a frequency of a regenerated timing signal present in the slave network element,
   receiving a digital data stream transmitted from the master network element, wherein a speed of arrival of the received data stream, expressed as a number of bits per second, depends on a frequency of a reference timing signal present in the master network element,
   receiving from the master network element a master end indicator a value or a change of the value of which in relation to time indicates a frequency difference between the reference timing signal and the regenerated timing signal, and
   forming, on the basis of the speed of arrival of the received data stream, a slave end indicator a value or the change of the value of which in relation to time indicates the frequency difference between the reference timing signal and the regenerated timing signal, and
   adjusting the frequency of the regenerated timing signal on the basis of a combined effect of information contained by the received master end indicator and information contained by the formed slave end indicator.

19. The method according to claim 18, wherein the slave end indicator is essentially fullness of a buffer memory located in the slave network element.

20. The method according to claim 18, wherein the slave end indicator is essentially a difference between fullness and a reference value of the fullness of a buffer memory located in the slave network element.

21. The method according to claim 18, wherein the slave end indicator is formed essentially by filtering a difference between fullness and a reference value of the fullness of a buffer memory located in the slave network element with a low-pass filter.

22. The method according to claim 18, wherein slave end indicator is formed by a time stamp method.

23. The method according to claim 18, wherein the frequency of the regenerated timing signal present in the slave network element is adjusted on the basis of an adjusting value, which is formed by a logical-mathematical operation utilizing both the information contained by the master end indicator and the information contained by the slave end indicator.

24. The method according to claim 23, wherein said logical-mathematical operation prevents frequency adjusting methods if said master end indicator and slave end indicator are not unanimous on a direction of a required frequency adjustment.

25. The method according to claim 23, wherein said adjusting value is connected to an input of a PI- or PID-regulator and the output of the regulator controls a timing signal generator, which produces the regenerated timing signal present in the slave network element.

26. An arrangement for regenerating a timing signal in digital data communication using a master/slave loop timing mode, the arrangement comprising:
   a master network element arranged to receive digital data transmitted from a slave network element operating as a slave and to transmit digital data to the slave network element, and
   a slave network element arranged to receive digital data transmitted from the master network element and to transmit digital data to the master network element,
   in the master network element, means for sending a digital data stream to the slave network element in such a way that a speed of arrival of the data stream, expressed as a number of bits per second, arriving at to slave network element depends on a frequency of a reference timing signal present in the master network element,
   in the slave network element, means for sending a digital data stream to the master network element in such a way that a speed of arrival of the data stream, expressed as a number of bits per second, arriving at the master network element depends on a frequency of a regenerated timing signal present in the slave network element,
   means for forming a master end indicator on the basis of the speed of arrival of the data stream arriving at the master network element, a value or a change of the value of the master end indicator in relation to time indicating a frequency difference between the reference timing signal and the regenerated timing signal,
   means for forming a slave end indicator on the basis of the speed of arrival of the data stream arriving at the slave network element, a value or a change of the value of the slave end indicator in relation to time indicating the frequency difference between the reference timing signal and the regenerated timing signal, and
   means for adjusting the frequency of the regenerated timing signal on the basis of a combined effect of information contained by said master end indicator and information contained by said slave end indicator.

27. The arrangement according to claim 26, wherein the arrangement comprises means for forming the master end indicator on the basis of fullness of a buffer memory located in the master network element.

28. The arrangement according to claim 26, wherein the arrangement comprises an arithmetic unit for forming the master end indicator on the basis of a difference between fullness and a reference value of the fullness of a buffer memory located in the master network element.

29. The arrangement according to claim 26, wherein the arrangement comprises a low-pass filter and an arithmetic unit for forming the master end indicator by filtering a difference between fullness and a reference value of the fullness of a buffer memory located in the master network element.

30. The arrangement according to claim 26, wherein the arrangement comprises means for forming the master end indicator by a time stamp method.

31. The arrangement according to claim 26, wherein the arrangement comprises means for forming the slave end indicator on the basis of fullness of a buffer memory located in the slave network element.

32. The arrangement according to claim 26, wherein the arrangement comprises an arithmetic unit for forming the slave end indicator on the basis of a difference between fullness and a reference value of the fullness of a buffer memory located in the slave network element.

33. The arrangement according to claim 26, wherein the arrangement comprises a low-pass filter and an arithmetic unit for forming the slave end indicator by filtering a difference between fullness and a reference value of the fullness of a buffer memory located in the slave network element.

34. The arrangement according to claim 26, wherein the arrangement comprises means for forming the slave end indicator by a time stamp method.

35. The arrangement according to claim 26, wherein the arrangement comprises a logical-mathematical signal processing unit for forming an adjusting value using both the information contained by the master end indicator and the information contained by the slave end indicator and means for adjusting the frequency of the regenerated timing signal on the basis of said adjusting value.

36. The arrangement according to claim 35, wherein the arrangement comprises a PI- or PID-regulator to an input of which said adjusting value has been connected, and an output of which has been connected to control a timing signal generator, which produces the regenerated timing signal present in the slave network element.

37. The arrangement according to claim 35, wherein said logical-mathematical signal processing unit has been arranged to prevent frequency adjustment actions of the regenerated timing signal as a response to a situation in which the master end indicator and the slave end indicator are not unanimous on the direction of the required frequency adjustment.

38. A master network element for contributing to regeneration of a timing signal in digital data transmission operating in a master/slave loop timing mode, the master network element comprising:
    means for sending a digital data stream to a slave network element functioning as the slave, wherein a speed of transmission of the data stream to be transmitted, expressed as a number of bits per second, depends on a frequency of a reference timing signal present in the master network element,
    means for receiving a digital data stream transmitted from the slave network element, wherein a speed of arrival of the received data stream, expressed as a number of bits per second, depends on a frequency of a regenerated timing signal present in the slave network element,
    means for forming a master end indicator on the basis of speed of arrival of the received data stream, a value or a change of the value of the master end indicator in relation to time indicating a frequency difference between the reference timing signal and the regenerated timing signal present in the slave network element, and
    means for sending said master end indicator to the slave network element.

39. The master network element according to claim 38, wherein the master network element comprises a buffer memory and means for forming the master end indicator on the basis of fullness of the buffer memory.

40. The master network element according to claim 38, wherein the master network element comprises a buffer memory and an arithmetic unit for forming the master end indicator on the basis of a difference between fullness of the buffer memory and its reference value.

41. The master network element according to claim 38, wherein the master network element comprises a buffer memory, a low-pass filter, and an arithmetic unit for forming the master end indicator by filtering a difference between fullness of the buffer memory and its reference value.

42. The master network element according to claim 38, wherein the master network element comprises means for forming the master end indicator by a time stamp method.

43. A slave network element for regenerating a timing signal in digital data communication using a master/slave loop timing mode, the slave network element comprising:
    means for sending a digital data stream to a master network element functioning as a master, wherein a speed of transmission of the data stream to be transmitted, expressed as a number of bits per second, depends on a frequency of a regenerated timing signal present in the slave network element, and
    means for receiving a digital data stream transmitted from the master network element, wherein a speed of arrival of the received data stream depends on a frequency of a reference timing signal present in the master network element,
    means for receiving a master end indicator transmitted from the master network element, a value or a change of the value of the master end indicator in relation to time indicating a frequency difference between the reference timing signal present in the master network element and the regenerated timing signal present in the slave network element,
    means for forming a slave end indicator on the basis of the speed of arrival of the data stream arriving at the slave network element, a value or a change of the value of the slave end indicator in relation to time indicating the frequency difference between the reference timing signal and the regenerated timing signal, and
    means for adjusting the frequency of the regenerated timing signal on the basis of a combined effect of information contained by the received master end indicator and information contained by the formed slave end indicator.

44. The slave network element according to claim 43, wherein the slave network element comprises a buffer memory and means for forming the slave end indicator on the basis of fullness of the buffer memory.

45. The slave network element according to claim 43, wherein the slave network element comprises a buffer memory and an arithmetic unit for forming the slave end indicator on the basis of a difference between fullness of the buffer memory and its reference value.

46. The slave network element according to claim 43, wherein the slave network element comprises a buffer memory, a low-pass filter, and an arithmetic unit for forming the slave end indicator by filtering the difference between fullness of the buffer memory and its reference value.

47. The slave network element according to claim 43, wherein the slave network element comprises means for forming the slave end indicator by a time stamp method.

48. The slave network element according to claim 43, wherein the slave network element comprises a logical-mathematical signal processing unit for forming an adjusting value using both the information contained by the master end indicator and the information contained by the slave end indicator, and means for adjusting the frequent of the regenerated time signal on the basis of said adjusting value.

49. The slave network element according to claim 48, wherein the slave network element comprises a PI- or PID-regulator to an input of which said adjusting value is connected and an output of which has been coupled to control a timing signal generator, which produces the regenerated timing signal present in the slave network element.

50. The slave network element according to claim 48, wherein said logical-mathematical signal processing unit has been arranged to prevent frequency adjustment actions of the regenerated timing signal as a response to a situation in which the master end indicator and the slave end indicator are not unanimous on a direction of a required frequency adjustment.

* * * * *